United States Patent
Yoshikawa (10) Patent No.: US 7,265,788 B2
(45) Date of Patent: Sep. 4, 2007

(54) LENS APPARATUS WITH CHANGEABLE IMAGE-CAPTURING FUNCTION SETTING

(75) Inventor: Kazumasa Yoshikawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 277 days.

(21) Appl. No.: 11/098,270

(22) Filed: Apr. 4, 2005

(65) Prior Publication Data

US 2005/0225661 A1 Oct. 13, 2005

(30) Foreign Application Priority Data

Apr. 9, 2004 (JP) .............................. 2004-115601

(51) Int. Cl.
*H04N 5/225* (2006.01)
(52) U.S. Cl. ..................................... 348/360; 348/231.3
(58) Field of Classification Search ................ 348/360, 348/361; 396/344, 345, 354
See application file for complete search history.

(56) References Cited

U.S. PATENT DOCUMENTS

| 6,036,137 | A  |   | 3/2000  | Myren |           |
|-----------|----|---|---------|-------|-----------|
| 6,348,948 | B1 | * | 2/2002  | Kyuma | 348/360   |
| 6,608,651 | B2 | * | 8/2003  | Mabuchi et al. | 348/335 |
| 6,727,940 | B1 |   | 4/2004  | Oka et al. |      |
| 6,992,720 | B2 | * | 1/2006  | Kaneda | 348/363 |
| 2001/0030707 | A1 | * | 10/2001 | Fujii | 348/335 |
| 2001/0055481 | A1 |   | 12/2001 | Kazumasa et al. | |

FOREIGN PATENT DOCUMENTS

| EP | 0737005      | 10/1996 |
|----|--------------|---------|
| JP | 2000-106671  | 4/2000  |
| JP | 2001-124979 A| 5/2001  |

\* cited by examiner

*Primary Examiner*—Tuan Ho
(74) *Attorney, Agent, or Firm*—Canon U.S.A. Inc I.P. Div (57) ABSTRACT

A lens apparatus in which setting information for each function related to image-capturing with the lens apparatus can be changed only by special operations. The lens apparatus includes an optical device, memory for storing setting data, and a controller for controlling changing the data in the memory. The function settings defined for each subject of TV shooting cannot be easily changed. As such, the problem of accidentally activating unintended functions during the operation of switches on a drive unit can thus be prevented.

2 Claims, 8 Drawing Sheets

| 301 | Focus-lens optical system | 312 | Iris-control unit |
| 302 | Focus motor | 313 | Extender optical system |
| 303 | Focus-position-detecting unit | 314 | Extender motor |
| 304 | Focus-control unit | 315 | Extender-position-detecting unit |
| 305 | Zoom-lens optical system | 316 | Extender-control unit |
| 306 | Zoom motor | 317 | CPU |
| 307 | Zoom-position-detecting unit | 318 | Memory |
| 308 | Zoom-control unit | 319 | First communication unit |
| 309 | Iris blade | 320 | Second communication unit |
| 310 | Iris motor | 321 | Third communication unit |
| 311 | Iris-position-detecting unit | 322 | Fourth communication unit |

LENS APPARATUS WITH CHANGEABLE IMAGE-CAPTURING FUNCTION SETTING

BACKGROUND OF THE INVENTION

This application is related to co-pending application 11/098,269 filed on Apr. 4, 2005.

1. Field of the Invention

The present invention relates to a lens apparatus, and to an image-capturing apparatus that includes the lens apparatus and a camera apparatus attached to the lens apparatus, and is used, for example, as a TV lens for TV shooting.

2. Description of the Related Art

An optical apparatus for use in TV shooting includes a TV camera body and a TV lens, which is attached to the TV camera body. The TV lens is mainly composed of a lens body and a drive unit. The lens body includes an image-capturing optical system and a manual ring for manually operating the image-capturing optical system. A motor for electrically driving the manual ring, a control board, and a CPU are stored inside the drive unit, which is externally provided with various switches and operating members for electric control. TV shooting used to be normally performed by manual zoom control and manual iris control of a TV lens. However, since TV shooting is often performed by an electric servomotor these days, various functions are added to a drive unit (see Japanese Patent No. 03420542 (no corresponding foreign application)).

Examples of such added functions include a preset function for allowing the zoom to be motor-driven to a previously stored position with the press of a switch. Another example is a function for allowing the user to freely assign such a preset function to any of a plurality of switches on the drive unit.

To set such various functions, the optical apparatus includes function-setting means, a display panel to be used therefor, and memory means for storing setting information for each function related to image-capturing with a TV lens. An optical apparatus having function-setting means with easy and quick adjustability and excellent operability can thus be provided.

Such various functions expand the range of image-capturing capability and enable the camera operator to perform the most suitable camera work according to the shooting situation.

An optical apparatus including a TV camera body and TV lens for TV shooting is often shared among many camera operators, as it is normally owned by a broadcasting company or production company, not by an individual. Therefore, since settings are determined differently depending on the operator, an unintended function previously defined by another operator may be accidentally activated, for example, during the operation of switches on the drive unit.

There are an increasing number of cases where function settings are determined depending on the subject of TV shooting. For example, since a preset function that allows for quick framing is required in sports broadcasting, a preset function with quick movement is normally assigned to a switch on a drive unit of an optical apparatus owned by a department involved in sports shooting. On the other hand, since a preset function with relatively slow movement is used in drama shooting, a preset function with slow movement is normally assigned to a switch on a drive unit of an optical apparatus owned by a department involved in drama shooting. The above-described problem also arises when these settings are changed by individual camera operators.

Since setting information for each function related to image-capturing with a TV lens can be changed only by special operations, function settings defined for each subject of TV shooting cannot be easily changed. Therefore, it is desirable to prevent the problem of accidentally activating unintended functions during the operation of switches on the drive unit.

SUMMARY OF THE INVENTION

The present invention is directed to a lens apparatus including an optical device; a memory configured to store data for driving the optical device, including user setting data corresponding to user setting values and initial setting data corresponding to initial setting values; and a controller controlling changing the data in the memory, wherein, in a setting-change disabled mode, the controller prohibits changing the user setting data rewritten based on the initial setting data.

In the present invention, since setting information for each function related to image-capturing with a TV lens can be changed only by special operations, function settings defined for each subject of TV shooting cannot be easily changed. Therefore, the problem of accidentally activating unintended functions during the operation of switches on the drive unit can be prevented.

Further features and advantages of the present invention will become apparent from the following description of exemplary embodiments with reference to the attached drawings.

DESCRIPTION OF THE EMBODIMENTS

It is to be understood that the present invention is not limited to the embodiments described below.

First Embodiment

Figure 1:
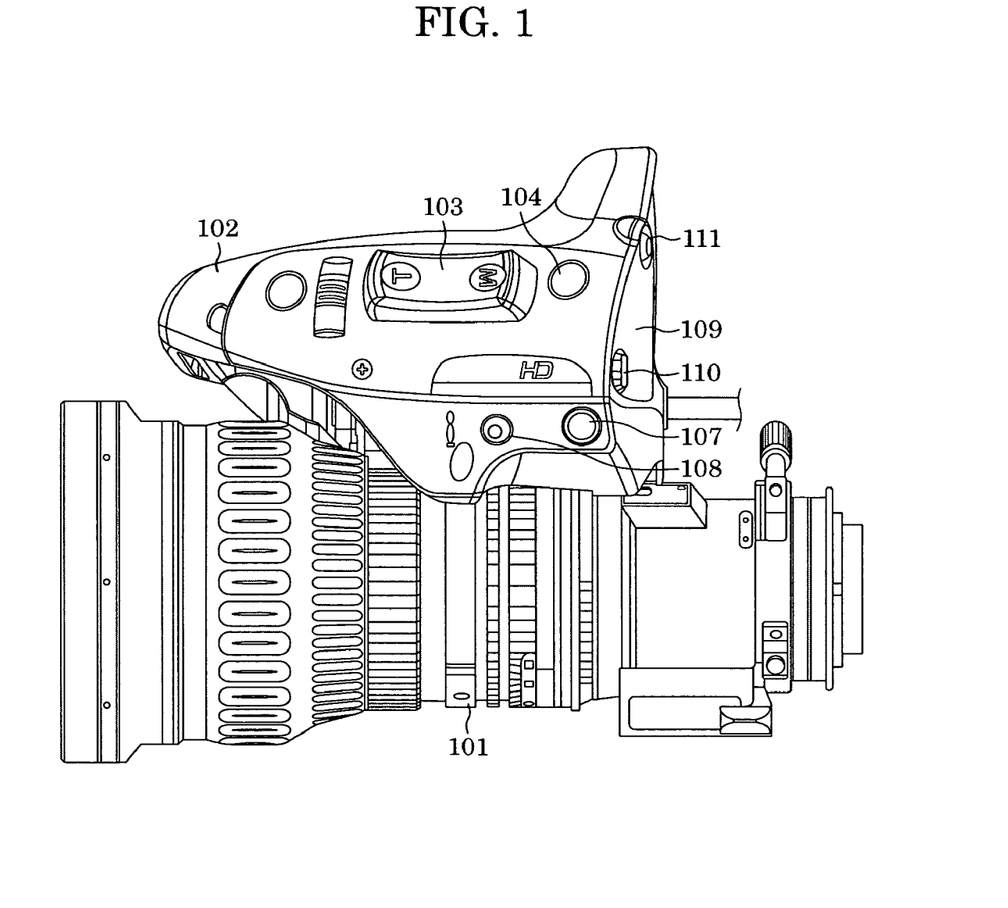
FIG. 1 is a top view of a TV lens according to a first embodiment.
Figure 2:
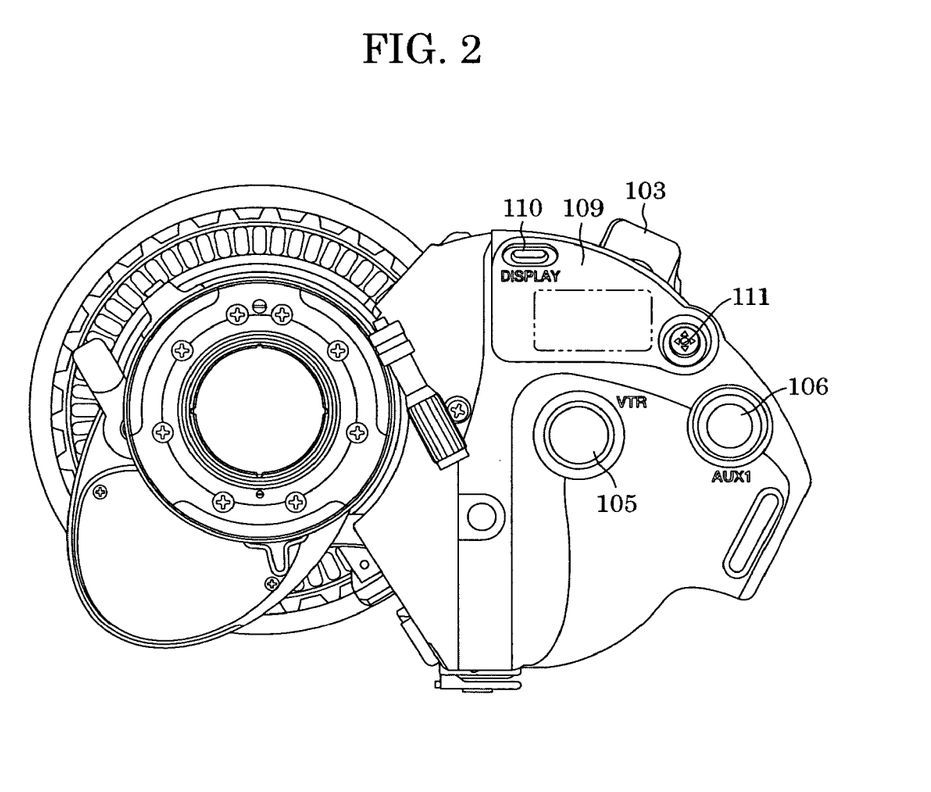
FIG. 2 is a back view of the TV lens according to the first embodiment.

A first embodiment of the present invention will now be described in detail with reference to the drawings. FIG. 1 and FIG. 2 are a top view and a back view, respectively, of a TV lens. An image-capturing optical system is disposed inside a lens body 101, and a manual ring for manually controlling focus, zoom, and an iris mechanism is disposed outside the lens body 101. A drive unit 102 is removably attached to the lens body 101 and stores a motor for electrically driving the manual ring, a control board, a CPU, and the like. A seesaw switch 103 is used to servo-drive the zoom. Pressing the seesaw switch 103 to the T or W position, in FIG. 1, changes the zoom to the telephoto or wide-angle direction at a speed depending on the degree of pressing. A return switch 104 is for sending signals back to the camera according to the switching operation. A VTR switch 105 serves as a trigger for recording. The seesaw switch 103, the return switch 104, and the VTR switch 105 are the most basic switches for TV shooting, and have been arranged in the same positions, as shown, over the long history of TV lens to allow operability.

A function switch A 106 can be assigned one of various functions related to image-capturing with the TV lens. For example, when a preset function is assigned to the function switch A 106, the camera operator can store the current zoom position by simultaneously pressing the function switch A 106 as well as a memory switch 108 described blow. A press of the function switch A 106 thus enables the zoom to return from any position to the stored position. Similarly, a function switch B 107 can also be assigned one of various functions related to image-capturing with the TV lens. For example, a function for moving the zoom back and forth with a press of the switch can be assigned to the function switch B 107. In this case, when the camera operator continuously holds down the function switch B 107 for zooming to the end of the telephoto range, where the depth of focus is small, then performs focusing, and releases his/her finger from the function switch B 107, the zoom is returned to the original position. The function switch B 107 can thus be used to assist focusing. To prevent an erroneous switch operation from causing sudden zoom movement when the camera operator manually controls the lens, the function switch A 106 and the function switch B 107 can be set such that they do not operate even when pressed. The memory switch 108 mentioned above is used to store, for example, the current zoom position, speed, and direction.

A liquid-crystal display panel 109 is provided on the back of the drive unit 102. A display switch 110 is provided for switching between display and non-display modes of the display panel 109. The display switch 110 is designed to activate the display panel 109 only when necessary, thereby contributing to the reduction in power consumption. A function-setting switch 111 is provided for setting various functions related to image-capturing with the TV lens.

Figure 3:
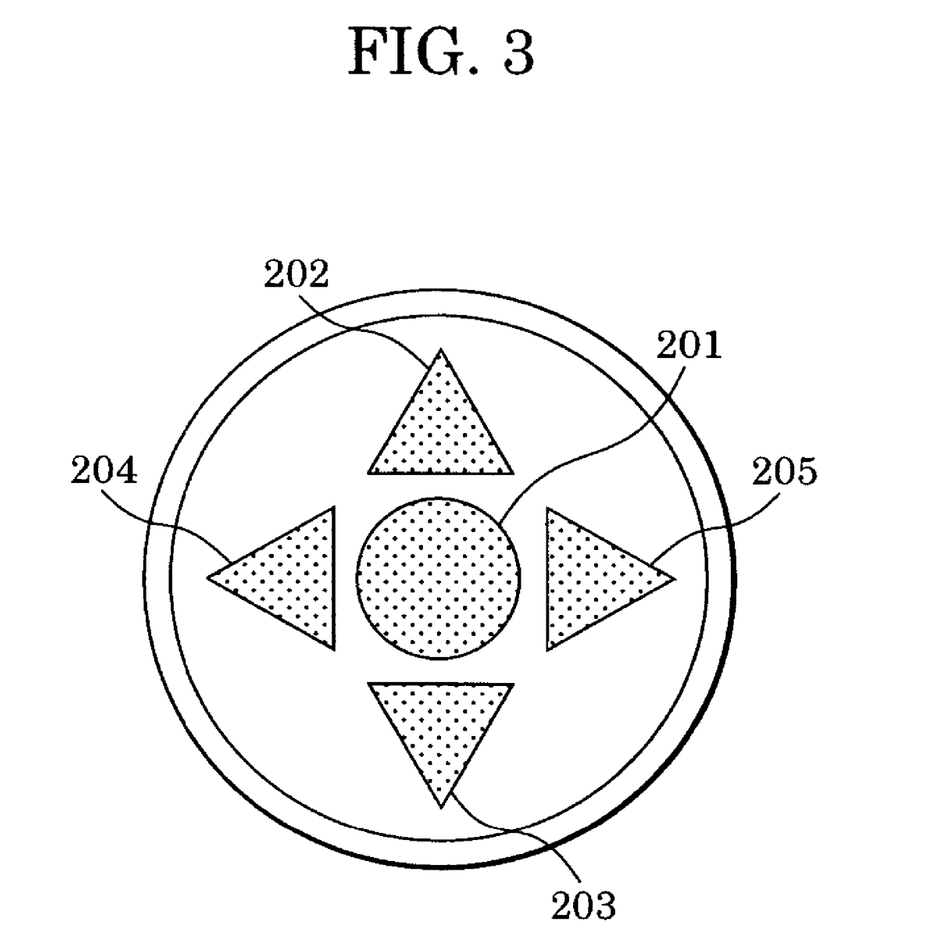
FIG. 3 shows a function-setting switch according to the first embodiment.

FIG. 3 is an enlarged view of the function-setting switch 111. The function-setting switch 111 in FIG. 3 includes four arrow keys 202, 203, 204, and 205, and one selection key 201. By moving a cursor with the arrow keys 202 to 205, one of a plurality of functions is selected from a hierarchical menu on the display panel 109 and is confirmed with the selection key 201.

Figure 4:
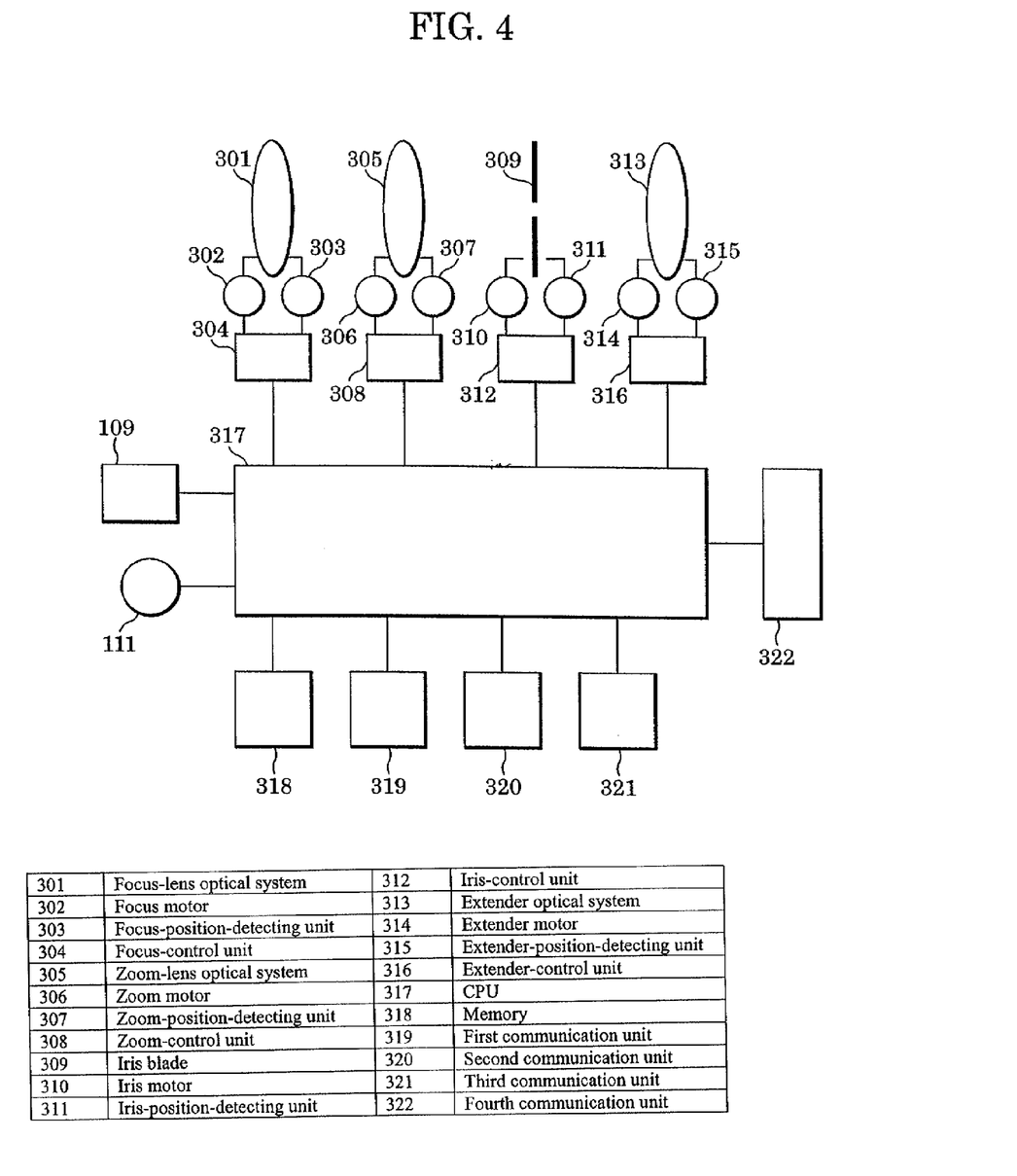
FIG. 4 shows the internal structure of a lens body according to the first embodiment.

The internal structure of the lens body 101 will now be described with reference to FIG. 4.

A focus-lens optical system 301 for focus adjustment is driven by a focus motor 302. A focus-position-detecting unit 303 outputs position signals corresponding to the position of the focus-lens optical system 301. A focus-control unit 304 controls the focus-lens optical system 301. A zoom-lens optical system 305 for zoom adjustment is driven by a zoom motor 306. A zoom-position-detecting unit 307 outputs position signals corresponding to the position of the zoom-lens optical system 305. A zoom-control unit 308 controls the zoom-lens optical system 305. An iris blade 309 for iris adjustment is driven by an iris motor 310. An iris-position-detecting unit 311 outputs position signals corresponding to the position of the iris blade 309. An iris-control unit 312 controls the iris blade 309. An extender optical system 313 for extending the focal length by a factor of, for example, 1.5 or 2.0 is driven by an extender motor 314. An extender-position-detecting unit 315 outputs position signals corresponding to the position of the extender optical system 313. An extender-control unit 316 controls the extender optical system 313. A CPU 317 is responsible for control over the entire lens apparatus of the present embodiment. The liquid-crystal display panel 109 is on the back of the drive unit 102. The function-setting switch 111 is provided for setting various functions related to image-capturing with the TV lens. Memory 318 stores various functions and characteristics related to image-capturing with the TV lens. A first communication unit 319 is for communicating with various switches provided on the drive unit 102. A second communication unit 320 is for data communication with devices outside the lens. A third communication unit 321 is for dealing with various demands, and a fourth communication unit 322 is for communicating with a TV camera.

Figure 5:
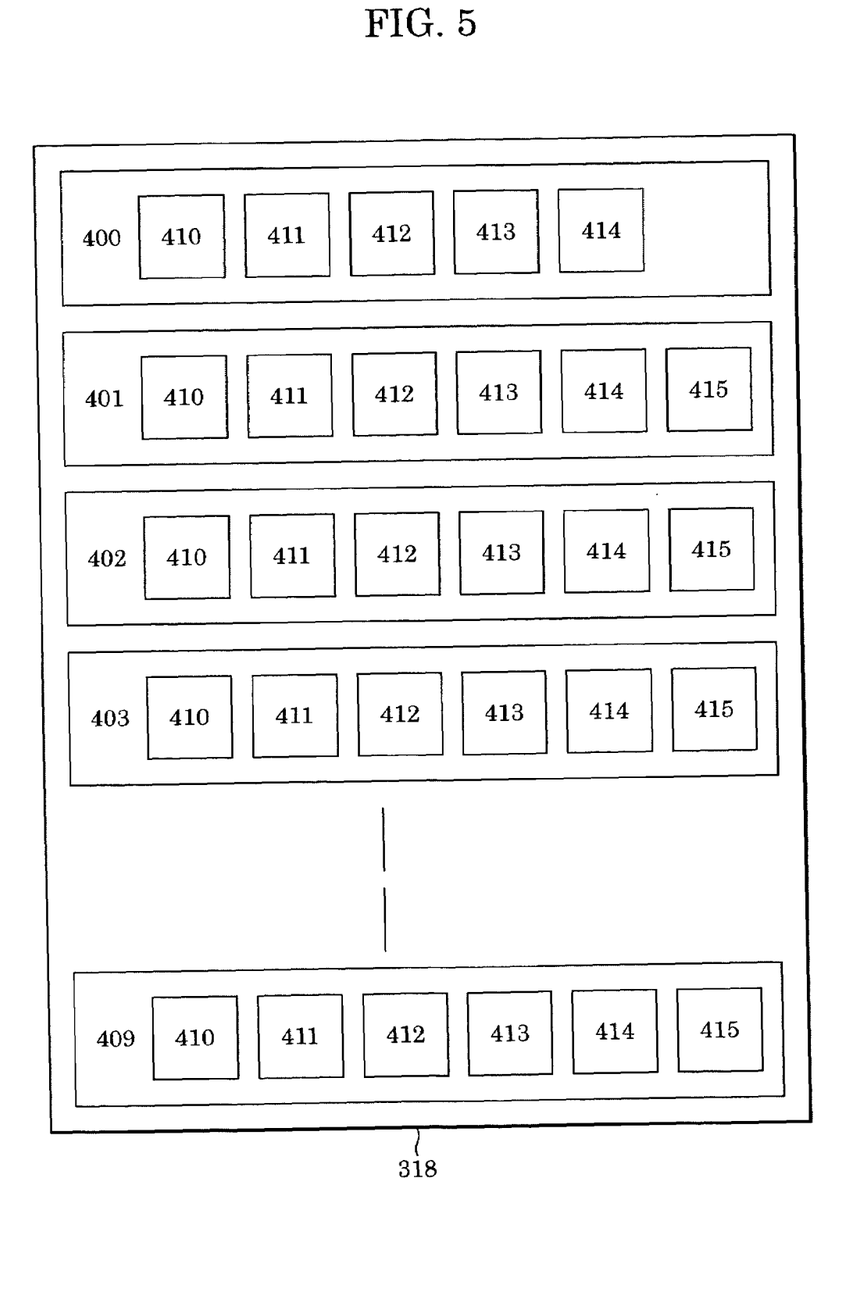
FIG. 5 shows the internal structure of memory according to the first embodiment.

FIG. 5 shows the internal structure of the memory 318. As shown, the memory 318 is divided into a plurality of user areas 400-409, each being assigned six function-setting subareas. The six subareas include a function-assignment information memory 410 for the assignment of functions to various switches provided on the drive unit 102, a preset-operation-characteristic information memory 411, an iris-operation-characteristic information memory 412, a zoom-operation-characteristic information memory 413, a focus-operation-characteristic information memory 414, and a password memory 415 for storing passwords to be used in setting-change disabled mode, in which the change of settings for each function is prohibited. In using the display panel 109 and the function-setting switch 111, these six function-setting subareas can be set individually in each of the user areas 400 to 409. No password memory is provided in the user area 400, which is for storing default setting information that cannot be rewritten.

Figure 6:
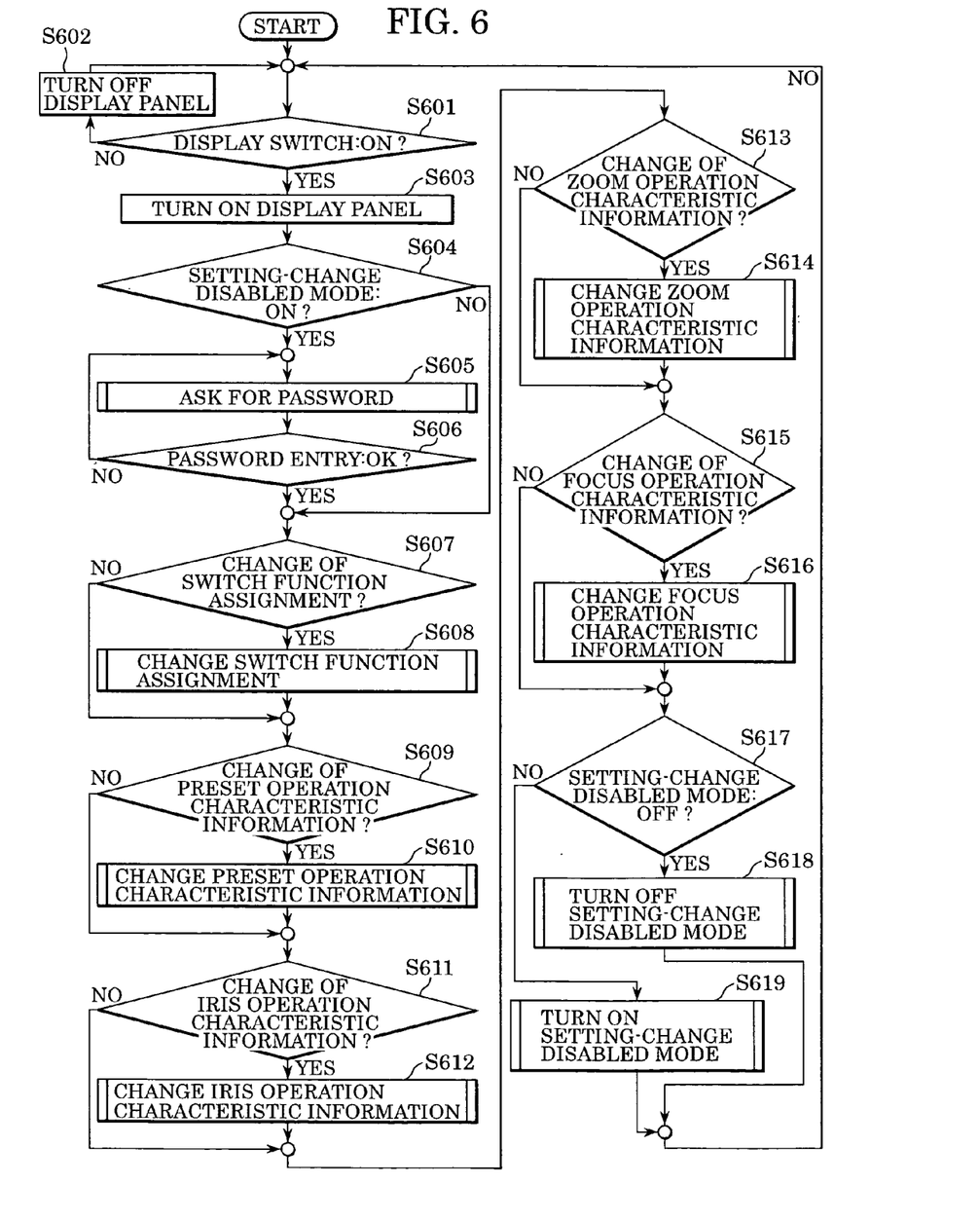
FIG. 6 is a flowchart showing a display operation according to the first embodiment.

Based on the structure described above, the operation, using the display panel 109 and the function-setting switch 111, for setting functions related to the operating characteristics of the lens and the operation for writing and rewriting such functions to the memory 318 will now be described in detail with reference to FIG. 6.

First, it is determined whether or not the display switch 110 is ON (step S601). If it is determined that the display switch 110 is not ON, the display panel 109 is turned OFF (step S602). If it is determined in step S601 that the display switch 110 is ON, the display panel 109 is turned ON (step S603). It is then determined whether or not a setting-change disabled mode, where the change of user setting data is prohibited, is currently ON (step S604). If it is determined that the setting-change disabled mode is ON, password entry is requested (step S605). Then the password entered is compared with a password stored in the password memory to determine whether or not they match (step S606). If it is determined that the password entered does not match the password stored in the password memory, the process returns to step S605. If it is determined in step S604 that the setting-change disabled mode is not ON, or if it is determined in step S606 that the password entered matches the password stored in the password memory, it is determined whether or not the function-setting switch 111 is used to change the assignment of functions to various switches on the drive unit 102 (step S607). If the function-setting switch 111 is used to change the assignment of functions to various switches on the drive unit 102, the assignment of functions to the switches is changed (step S608) and the process proceeds to step S609. If the use of the function-setting switch 111 is not intended to change the assignment of functions to various switches on the drive unit 102, the process proceeds to step S609. Then, it is determined whether or not the function-setting switch 111 is used to change preset operation characteristic information (step S609). If the function-setting switch 111 is used to change preset operation characteristic information, the preset operation characteristic information is changed (step S610) and the process proceeds to step S611. If the use of the function-setting switch 111 is not intended to change preset operation characteristic information, the process proceeds to step S611. Then, it is determined whether or not the function-setting switch 111 is used to change iris operation characteristic information (step S611). If the function-setting switch 111 is used to change iris operation characteristic information, the iris operation characteristic information is changed (step S612) and the process proceeds to step S613. If the use of the function-setting switch 111 is not intended to change iris operation characteristic information, the process proceeds to step S613. Then, it is determined whether or not the function-setting switch 111 is used to change zoom operation characteristic information (step S613). If the function-setting switch 111 is used to change zoom operation characteristic information, the zoom operation characteristic information is changed (step S614) and the process proceeds to step S615. If the use of the function-setting switch 111 is not intended to change zoom operation characteristic information, the process proceeds to step S615. Then, it is determined whether or not the function-setting switch 111 is used to change focus operation characteristic information (step S615). If the function-setting switch 111 is used to change focus operation characteristic information, the focus operation characteristic information is changed (step S616) and the process proceeds to step S617. If the use of the function-setting switch 111 is not intended to change focus operation characteristic information, the process proceeds to step S617. Then, it is determined whether or not the function-setting switch 111 is used to turn OFF the setting-change disabled mode for allowing the change of user setting data (step S617). If the function-setting switch 111 is used to turn OFF the setting-change disabled mode for allowing the change of user setting data, the function-setting switch 111 is turned OFF (step S618). If the function-setting switch 111 is used to turn ON the setting-change disabled mode for prohibiting the change of user setting data, the setting-change disabled mode is turned ON (step S619).

In the first embodiment, setting information for each function related to image-capturing with the TV lens cannot be changed unless a password is entered. Another possible configuration is to turn ON and OFF the setting-change disabled mode by a special operation, such as simultaneously holding down the function switch A 106 and the function switch B 107 for three seconds or more.

Moreover, four arrow keys used as a function-setting switch in the present embodiment may be replaced with any other setting switch, such as a jog shuttle switch, that can be used for setting functions according to the flow displayed on the display panel.

Furthermore, the display panel and the function-setting switch provided on the drive unit in the present embodiment may be arranged anywhere on the TV lens formed of the lens body and the drive unit.

In the present invention, since setting information for each function related to image-capturing with a TV lens can be changed only by a special operation, function settings defined for each subject of TV shooting cannot be easily changed. Therefore, the problem of accidentally activating unintended functions during the operation of switches on the drive unit can be prevented.

Second Embodiment

The first embodiment is configured such that no user setting data can be changed when the change of user setting data is prohibited. However, effective use of a preset function can be achieved if the configuration allows for the change of preset information, such as preset position, preset speed, and preset direction, that is stored in a preset-operation-characteristic information memory.

A second embodiment of the present invention will now be described in detail with reference to the drawings. The structures shown in FIGS. 1 to 4, which are the same as those of the first embodiment, will not be described here. What will be described here are the differences, that is, the internal structure of the memory 318, the operation, the use of the display panel 109 and the function-setting switch 111, for setting functions related to the operating characteristics of the lens, and the operation for writing and rewriting such functions to the memory 318.

Figure 7:
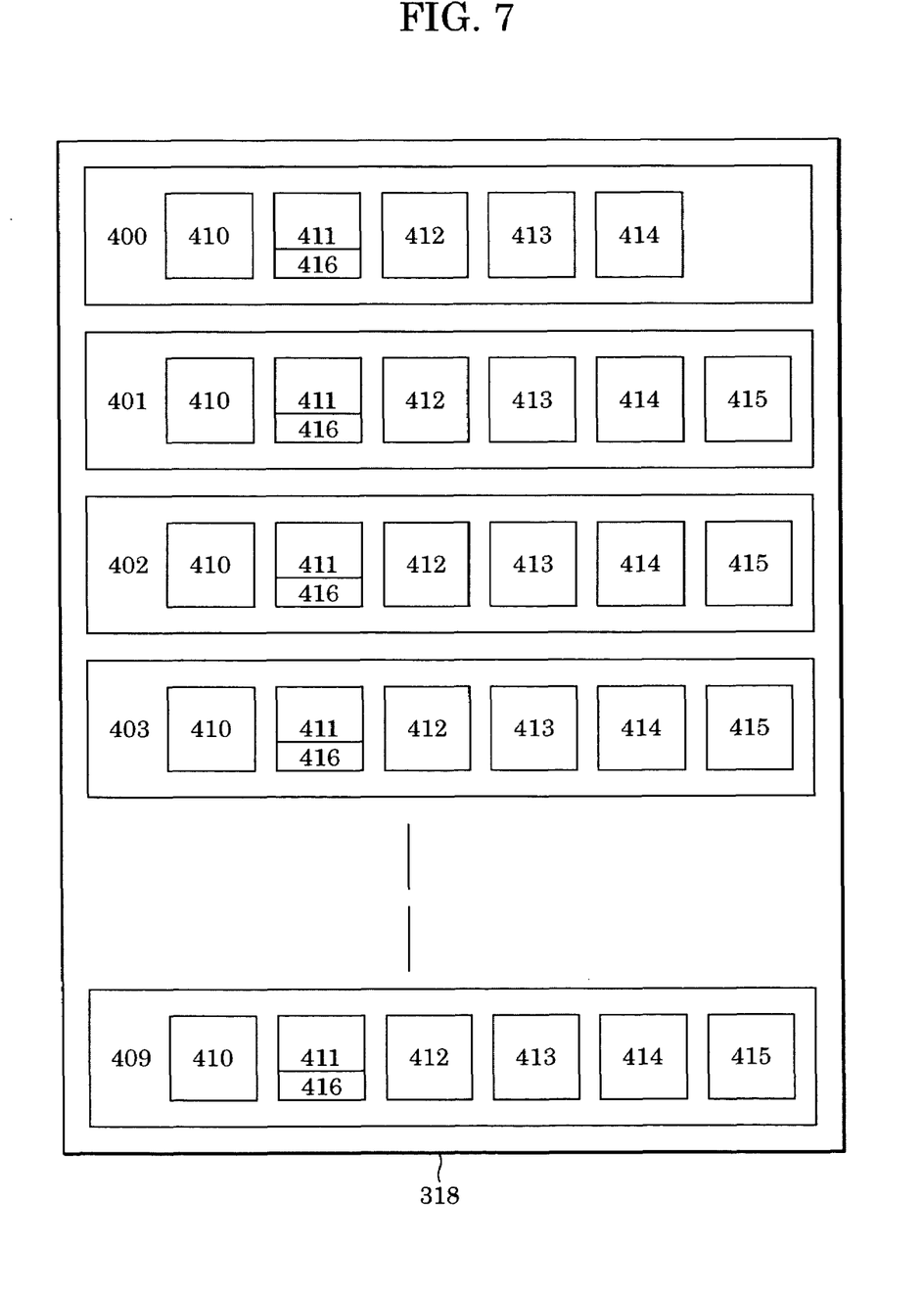
FIG. 7 shows the internal structure of memory according to a second embodiment.

FIG. 7 illustrates the internal structure of the memory 318. The descriptions of user areas 400 to 409 and memories 410 to 415 will be omitted, as they are the same as those in the first embodiment. A preset information submemory 416 provided within the preset-operation-characteristic information memory 411 is for storing preset information, such as preset position, preset speed, and preset direction.

Figure 8:
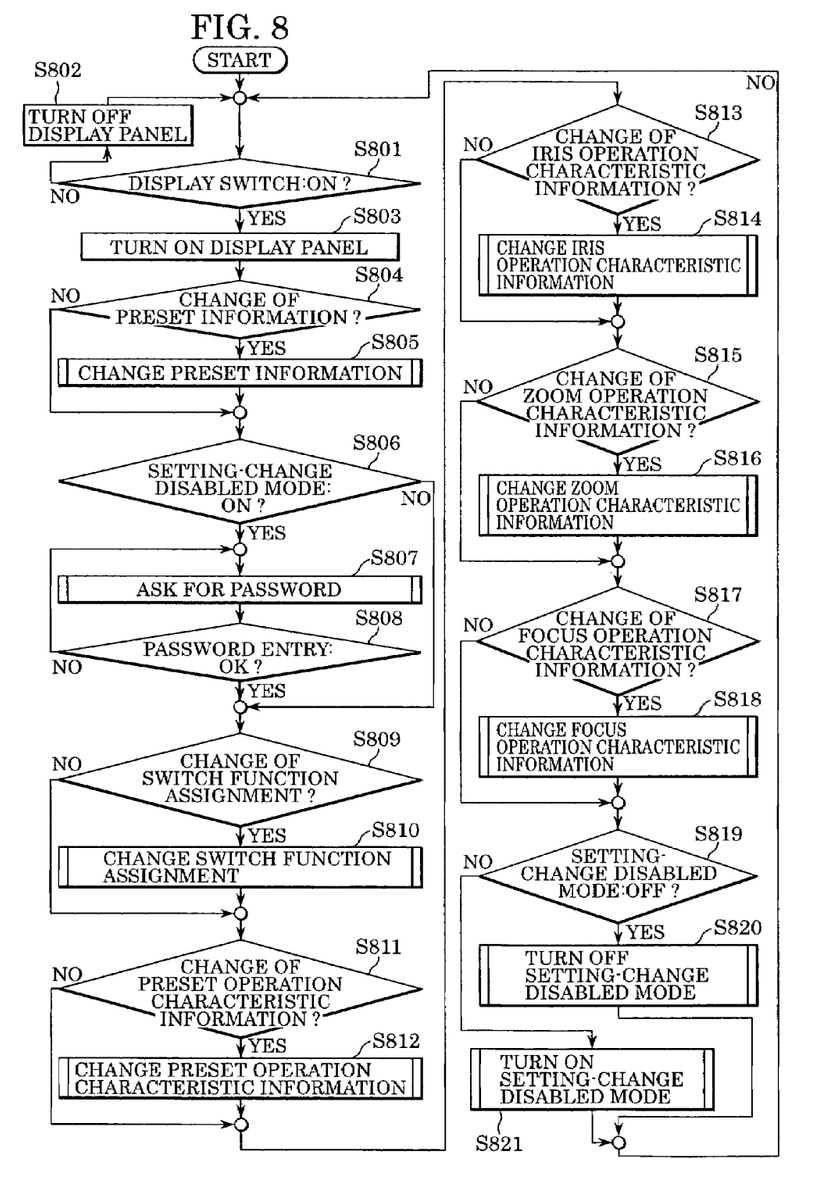
FIG. 8 is a flowchart showing a display operation according to the second embodiment.

Based on the structure described above, the operation, using the display panel 109 and the function-setting switch 111, for setting functions related to the operating characteristics of the lens and the operation for writing and rewriting such functions to the memory 318 will now be described in detail with reference to FIG. 8.

First, it is determined whether or not the display switch 110 is ON (step S801). If it is determined that the display switch 110 is not ON, the display panel 109 is turned OFF (step S802). If it is determined in step S801 that the display switch 110 is ON, the display panel 109 is turned ON (step S803). It is then determined whether or not the function-setting switch 111 is used to change the preset information (step S804). If the function-setting switch 111 is used to change the preset information, the preset information is changed (step S805) and the process proceeds to step S806. If the use of the function-setting switch 111 is not intended to change the preset information, the process proceeds to step S806. It is then determined whether or not a setting-change disabled mode, where change of user setting data is prohibited, is currently ON (step S806). If it is determined that the setting-change disabled mode is ON, password entry is requested (step S807). Then the password entered is compared with a password stored in the password memory to determine whether or not they match (step S808). If it is determined that the password entered does not match the password stored in the password memory, the process returns to step S807. If it is determined in step S806 that the setting-change disabled mode is not ON, or if it is determined in step S808 that the password entered matches the password stored in the password memory, it is determined whether or not the function-setting switch 111 is used to change the assignment of functions to various switches on the drive unit 102 (step S809). If the function-setting switch 111 is used to change the assignment of functions to various switches on the drive unit 102, the assignment of functions to the switches is changed (step S810) and the process proceeds to step S811. If the use of the function-setting switch 111 is not intended to change the assignment of functions to various switches on the drive unit 102, the process proceeds to step S811. Then, it is determined whether or not the function-setting switch 111 is used to change preset operation characteristic information (step S811). If the function-setting switch 111 is used to change preset operation characteristic information, the preset operation characteristic information is changed (step S812) and the process proceeds to step S813. If the use of the function-setting switch 111 is not intended to change preset operation characteristic information, the process proceeds to step S813. Then, it is determined whether or not the function-setting switch 111 is used to change iris operation characteristic information (step S813). If the function-setting switch 111 is used to change iris operation characteristic information, the iris operation characteristic information is changed (step S814) and the process proceeds to step S815. If the use of the function-setting switch 111 is not intended to change iris operation characteristic information, the process proceeds to step S815. Then, it is determined whether or not the function-setting switch 111 is used to change zoom operation characteristic information (step S815). If the function-setting switch 111 is used to change zoom operation characteristic information, the zoom operation characteristic information is changed (step S816) and the process proceeds to step S817. If the use of the function-setting switch 111 is not intended to change zoom operation characteristic information, the process proceeds to step S817. Then, it is determined whether or not the function-setting switch 111 is used to change focus operation characteristic information (step S817). If the function-setting switch 111 is used to change focus operation characteristic information, the focus operation characteristic information is changed (step S818) and the process proceeds to step S819. If the use of the function-setting switch 111 is not intended to change focus operation characteristic information, the process proceeds to step S819. Then, it is determined whether or not the function-setting switch 111 is used to turn OFF the setting-change disabled mode for allowing the change of user setting data (step S819). If the function-setting switch 111 is used to turn OFF the setting-change disabled mode for allowing the change of user setting data, the function-setting switch 111 is turned OFF (step S820). If the function-setting switch 111 is used to turn ON the setting-change disabled mode for prohibiting the change of user setting data, the setting-change disabled mode is turned ON (step S821).

In the second embodiment, setting information for each function related to image-capturing with the TV lens cannot be changed unless a password is entered. Another possible configuration is to turn ON and OFF the setting-change disabled mode by a special operation, such as simultaneously holding down the function switch A 106 and the function switch B 107 for three seconds or more.

Moreover, four arrow keys used as a function-setting switch in the present embodiment may be replaced with any other setting switch, such as a jog shuttle switch, that can be used for setting functions according to the flow displayed on the display panel.

Furthermore, the display panel and the function-setting switch provided on the drive unit in the present embodiment may be arranged anywhere on the TV lens formed of the lens body and the drive unit.

In the present invention, since setting information for each function related to image-capturing with the TV lens can be changed only by special operations, function settings defined for each subject of TV shooting cannot be easily changed. Therefore, the problem of accidentally activating unintended functions during the operation of switches on the drive unit can be prevented.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-115601 filed Apr. 9, 2004, which is hereby incorporated by reference herein.

What is claimed is:

1. A lens apparatus comprising:
    an optical device;
    a user input device allowing a user to input a password entry;
    a memory configured to store data for driving the optical device, including user setting data corresponding to user setting values, password data, and initial setting data corresponding to initial setting values; and
    a controller controlling changing the data in the memory,
    wherein, in a setting-change disabled mode, the controller prohibits changing the user setting data rewritten based on the initial setting data, and
    wherein the controller allows to change the user setting data responsive to the password entry matching the password data.

2. An image-capturing apparatus comprising the lens apparatus according to claim 1 and a camera apparatus attached to the lens apparatus.

* * * * *